3,644,340
PREPARATION OF 21-CHLORO STEROIDS
Belig M. Berkoz, Los Altos Hills, Calif., assignor to
Syntex Corporation, Panama, Panama
No Drawing. Filed Mar. 19, 1970, Ser. No. 21,215
Int. Cl. C07c *173/00*
U.S. Cl. 260—239.55 D         7 Claims

ABSTRACT OF THE DISCLOSURE

A process for preparing 21-chloro steroids which involves the step of treating a 21-hydroxy steroid with triphenylphosphine and carbon tetrachloride in dipolar aprotic reaction media. The 21-chloro steroid products are known, useful anti-inflammatory agents.

The present invention relates to advances in organic process chemistry. More particularly, the present invention is directed to a new one step method useful for preparing 21-chloro steroids of the pregnane series which are known useful anti-inflammatory agents.

The process of the present invention comprises the step of reacting a 21-hydroxy steroid of the pregnane series in dipolar aprotic reaction media with triphenylphosphine and carbon tetrachloride to prepare the corresponding 21-chloro steroid. This process can be depicted by the following equation of steroid partial formulas:

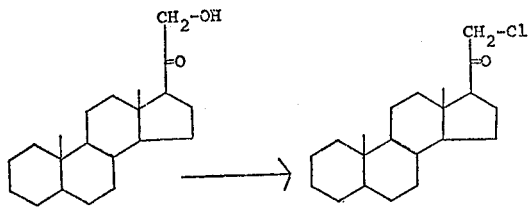

In the practice of the process of the present invention, a 21-hydroxy steroid of the pregnane series is reacted together with triphenylphosphine and carbon tetrachloride in dipolar aprotic reaction media. The reaction is further conducted at temperatures ranging from about 10° C. or less to about 125° C. or more and for a period of time ranging from about 3 minutes to about 6 hours or more. Higher or lower temperatures and/or longer reaction times can be employed depending upon choice of substrate, dipolar aprotic reaction media, and other, physical characteristics which may be employed such as stirring, use of pressure whether super or sub atmospheric. In general, these equivalent modifications are within the usual and ordinary skill in the art and, as such, are included within the scope hereof.

Suitable dipolar aprotic reaction media include dimethylformamide, dimethylacetamide, N-methyl-2-pyrrolidone, hexamethylphosphoric triamide, and so forth.

The reaction consumes the reactants upon the basis of one mole of 21-hydroxy starting steroid per mole each of triphenylphosphine and carbon tetrachloride. However, the amounts of the reactants to be empolyed are not critical, some of the desired 21-chloro steroid product being obtained when employing any proportions thereof. In the preferred embodiments, the reaction is conducted by reacting from about 1 to about 2 moles or more of triphenylphosphine and from 1 to about 10 moles of carbon tetrachloride per mole of starting steroid and the dipolar aprotic reaction media in solvent amounts.

In the practice of the process steps, the reactants are contacted and maintained together in any convenient order or fashion and within the given temperature range for a period of time sufficient to produce product. Following reaction, the product can be separated and isolated via any conventional technique such as decantation, filtration, extraction, evaporation, distillation, and chromatography.

The present invention is useful for the preparation of 21 - chloro pregnane steroids generally. The 21 - chloro steroid products hereof are known compounds useful as anti-inflammatory agents. In a particularly preferred embodiment, the present invention is useful for the preparation of 21-chloro steroids of the following Formula A:

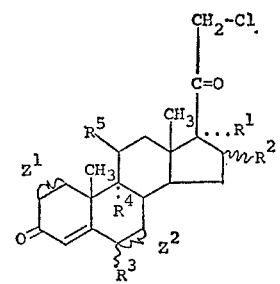

(A)

wherein,
$R^1$ is hydroxy or a conventional hydrolyzable ester thereof;
$R^2$ is α-methyl, β-methyl, methylene, hydroxy or a conventional hydrolyzable ester thereof, or, when taken together with $R^1$ the group

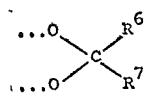

in which each of $R^6$ and $R^7$ is hydrogen, lower alkyl, monocyclic cycloalkyl, or monocyclic aryl;
$R^3$ is hydrogen, methyl, chloro, or fluoro;
$R^4$ is hydrogen, chloro, or fluoro;
$R^5$ is oxo or the group

in which $R^8$ is hydroxy or chloro, provided $R^4$ is chloro when $R^8$ is chloro; and
Each of $Z^1$ and $Z^2$ is a carbon-carbon single bond or a carbon-carbon double bond.

The compounds of the present invention particularly as depicted by Formula A are anti-inflammatory agents useful in the treatment of contact dermatitis, arthritis, and so forth. As such, they can be used, in accordance with the ordinary skills of the art, in the same manner as other known anti-inflammatory agents, such as fluocinolone acetonide.

The starting 21-hydroxy steroids preferably contain the desired elaborative groups at the other sites of the molecule. However, these optional elaborative groups may be introduced, if desired, after the principal process hereof. Thus, the process of the present invention can be practiced upon elaborated starting compounds or starting compounds capable of further elaboration after the principal reaction, particularly in accordance with the scope of the compounds depicted by Formula A above. In the preferred embodiments, hydroxy groups other than the 21-hydroxyl are suitably protected during the principal reaction hereof such as by forming a conventional ester or ether thereof.

The starting 21-hydroxy starting compounds are known and can be prepared via methods known per se.

The term "conventional hydrolyzable ester," as used herein, refers to those hydrolyzable carboxylic ester groups conventionally employed in the synthetic hormone art such as those derived from hydrocarbon carboxylic acids. These hydrolyzable carboxylic esters are derived from both substituted and unsubstituted hydrocarbon carboxylic acids. These acids can be completely saturated or possess varying degrees of unsaturation (including aromatic), can be of straight chain, branched chain, or cyclic structure, and preferably contain from 1 to 12 carbon atoms. In addition, they can be substituted by functional groups, for example, hydroxy, alkoxy containing up to six carbon atoms, acyloxy containing up to 12 carbon atoms, nitro, amino, halogeno, and the like, attached to the hydrocarbon backbone chain. Typical conventional hydrolyzable esters thus included are acetate, propionate, butyrate, valerate, caproate, enanthate, cyprylate, pelargonate, acrylate, undecanoate, phenoxyacetate, benzoate, phenylacetate, diphenylacetate, diethylacetate, trimethylacetate, t-butylacetate, trimethylhexanoate, methylneopentylacetate, cyclohexylacetate, cyclopentylpropionate, adamantoate, glycolate, methoxyacetate, hemisuccinate, hemiadipate, hemi-$\beta,\beta$-dimethylglutarate, acetoxyacetate, 2-chloro-4-nitrobenzoate, aminoacetate, diethylaminoacetate, piperidinoacetate, $\beta$-chloropropionate, trichloroacetate, $\beta$-chlorobutyrate, and the like.

The term "lower alkyl" as used herein, denotes methyl, ethyl, propyl, butyl, pentyl, hexyl, the various isomers thereof. The term monocyclic cycloalkyl denotes cyclopentyl and cyclohexyl. The term "monocyclic aryl" denotes phenyl and substituted phenyl such as p-methylphenyl.

The following examples are provided to illustrate the present invention. As such, however, they should be construed merely as illustrated and not as limitative upon the overall scope hereof.

EXAMPLE 1

A mixture of $6\alpha,9\alpha$-difluoro-$16\alpha,17\alpha$-isopropylidenedioxypregna-1,4-diene-$11\beta,12$-diol-3,20-dione (507 micrograms), 523 micrograms of triphenylphosphine, 0.2 ml. of carbon tetrachloride in 5 ml. of dimethylformamide is prepared at room temperature and then heated at 110° C. for 3 minutes. After this time, 60 micrograms of triphenylphosphine and 0.01 ml. of carbon tetrachloride are added to the mixture and the resultant mixture heated at 110° C. for another 3 minutes. After this time, the reaction mixture is evaporated under reduced pressure and chromatographed on a 20% acetone-80% carbon tetrachloride system to provide the $6\alpha,9\alpha$-difluoro-$16\alpha,17\alpha$-isopropylidenedioxy-21-chloropregna-1,4-dien-$11\beta$-ol - 3,20-dione product which can be recrystallized from tetrahydrofuran-isopropanol.

EXAMPLE 2

To a solution of 1 molar equivalent each of $6\alpha$-fluoro-$9\alpha,11\beta$-dichloro - $16\alpha,17\alpha$ - isopropylidenedioxypregna-1,4-dien-21-ol-3,20-dione and triphenylphosphine in 1000 ml. of dimethylformamide is added 150 ml. of carbon tetrachloride. The reaction mixture is allowed to stand for 6 hours at 20° C. and then heated at 90° for 1 hour. The reaction mixture is then evaporated under reduced pressure and the resulting residue purified by chromatography to provide the $6\alpha$-fluoro-$9\alpha,11\beta,21$-trichloro-$16\alpha,17\alpha$-isopropylidenedioxypregna-1,4-diene-3,20-dione product.

EXAMPLE 3

The procedure of Example 2 is repeated, with similar results, employing dimethylacetamide in lieu of dimethylformamide. In addition, the reaction is conducted at 120° C. for a period of 1 hour.

EXAMPLE 4

The procedure of Example 2 is repeated employing dimethylacetamide in lieu of dimethylformamide, with similar results.

EXAMPLE 5

The procedure of Example 1 is repeated employing hexamethylphosphoric triamide, in lieu of dimethylformamide, with similar results.

EXAMPLE 6

The procedure of Example 1 is repeated employing dimethylacetamide in lieu of dimethylformamide, with similar results.

EXAMPLE 7

The procedure of Example 2 is repeated using, in addition dimethylformamide, dimethylacetamide with similar results.

EXAMPLES 8–26

In accordance with the foregoing methods, the starting compounds listed in Column B below are treated with triphenylphosphine and carbon tetrachloride in dipolar aprotic reaction media to respectively provide the products listed in Column C below.

| Column B | Column C |
|---|---|
| $9\alpha$-chloro-$16\alpha,17\alpha$-isopropylidenedioxypregna-1,4-diene-$11\beta,21$-diol-3,20-dione. | $9\alpha,21$-dichloro-$16\alpha,17\alpha$-isopropylidenedioxypregna-1,4-dien-$11\beta$-ol-3,20-dione. |
| $6\alpha$-fluoro-$9\alpha,11\beta$-dichloro-$16\alpha,17\alpha$-isopropylidenedioxypregna-1,4-dien-21-ol-3,20-dione. | $6\alpha$-fluoro-$9\alpha,11\beta,21$-trichloro-$16\alpha,17\alpha$-isopropylidenedioxypregna-1,4-diene-3,20-dione. |
| $6\alpha,9\alpha,11\beta$-trichloro-$16\alpha,17\alpha$-isopropylidenedioxypregna-1,4-dien-21-ol-3,20-dione. | $6\alpha,9\alpha,11\beta,21$-tetrachloro-$16\alpha,17\alpha$-isopropylidenedioxypregna-1,4-diene-3,20-dione. |
| $6\alpha,9\alpha,11\beta$-trichloro-$16\alpha,17\alpha$-isopropylidenedioxypregna-1,4-dien-21-ol-3,20-dione. | $6\alpha,9\alpha,11\beta,21$-tetrachloro-$16\alpha,17\alpha$-isopropylidenedioxypregna-1,4-diene-3,20-dione. |
| $6\alpha,9\alpha$-difluoro-$16\alpha,17\alpha$-isopropylidenedioxypregna-1,4-diene-$11\beta,21$-diol-3,20-dione. | $6\alpha,9\alpha$-difluoro-$16\alpha,17\alpha$-isopropylidenedioxy-21-chloropregna-1,4-dien-$11\beta$-ol-3,20-dione. |
| $9\alpha$-chloro-$16\alpha,17\alpha$-isopropylidenedioxypregna-1,4-diene-$11\beta,21$-diol-3,20-dione. | $9\alpha,21$-dichloro-$16\alpha,17\alpha$-isopropylidenedioxypregna-1,4-dien-$11\beta$-ol-3,20-dione. |
| $9\alpha,11\beta$-dichloro-$16\alpha$-methyl-$17\alpha$-acetoxypregna-1,4-dien-21-ol-3,20-dione. | $9\alpha,11\beta,21$-trichloro-$16\alpha$-methyl-$17\alpha$-acetoxypregna-1,4-diene-3,20-dione. |
| $6\alpha,9\alpha$-difluoro-$16\alpha,17\alpha$-isopropylidenedioxypregna-1,4-dien-21-ol-3,20-dione. | $6\alpha,9\alpha$-difluoro-$16\alpha,17\alpha$-isopropylidenedioxy-21-chloropregna-1,4-diene-3,20-dione. |
| $6\alpha,9\alpha$-difluoro-$16\alpha,17\alpha$-isopropylidenedioxypregn-4-en-21-ol-3,20-dione. | $6\alpha,9\alpha$-difluoro-$16\alpha,17\alpha$-isopropylidenedioxy-21-chloropregn-4-ene-3,20-dione. |
| $6\alpha$-fluoro-$9\alpha,11\beta$-dichloro-$16\alpha$-methyl-$17\alpha$-acetoxypregna-1,4-dien-21-ol-3,20-dione. | $6\alpha$-fluoro-$9\alpha,11\beta,21$-trichloro-$16\alpha$-methyl-$17\alpha$-acetoxypregna-1,4-diene-3,20-dione. |
| $6\alpha$-methyl-$9\alpha,11\beta$-dichloro-$17\alpha$-acetoxypregna-1,4-dien-21-ol-3,20-dione. | $6\alpha$-methyl-$9\alpha,11\beta,21$-trichloro-$17\alpha$-acetoxypregna-1,4-diene-3,20-dione. |
| $9\alpha,11\beta$-dichloro-$16\alpha,17\alpha$-diacetoxypregna-1,4-dien-21-ol-3,20-dione. | $9\alpha,11\beta$-dichloro-$16\alpha,17\alpha$-diacetoxy-21-chloropregna-1,4-diene-3,20-dione. |
| $9\alpha$-fluoro-$16\alpha,17\alpha$-isopropylidenedioxypregna-1,4-diene-$11\beta,21$-diol-3,20-dione. | $9\alpha$-fluoro-$16\alpha,17\alpha$-isopropylidenedioxy-21-chloropregna-1,4-dien-$11\beta$-ol-3,20-dione. |
| $9\alpha,11\beta$-dichloro-$16\beta$-methyl-$17\alpha$-acetoxypregna-1,4-dien-21-ol-3,11,20-trione. | $9\alpha,11\beta,21$-trichloro-$16\beta$-methyl-$17\alpha$-acetoxypregna-1,4-diene-3,11,20-trione. |
| $16\beta$-methyl-$17\alpha$-acetoxypregna-1,4-dien-21-ol-3,11,20-trione. | $16\beta$-methyl-$17\alpha$-acetoxy-21-chloropregna-1,4-diene-3,11,20-trione. |
| $9\alpha,11\beta$-dichloro-$17\alpha$-acetoxypregn-4-en-21-ol-3,20-dione. | $9\alpha,11\beta,21$-trichloro-$17\alpha$-acetoxypregn-4-ene-3,20-dione. |
| $6\alpha$-fluoro-$9\alpha,11\beta$-dichloro-$16\alpha,17\alpha$-isopropylidenedioxypregn-4-en-21-ol-3,20-dione. | $6\alpha$-fluoro-$9\alpha,11\beta,21$-trichloro-$16\alpha,17\alpha$-isorpopylidenedioxypregn-4-en-3,20-dione. |
| $6\alpha,9\alpha,11\beta$-trichloro-$16\alpha,17\alpha$-isopropylidenedioxypregn-4-en-21-ol-3,20-dione. | $6\alpha,9\alpha,11\beta,21$-tetrachloro-$16\alpha,17\alpha$-isopropylidenedioxypregn-4-en-3,20-dione. |

The following procedures illustrate the manner by which esters ad ethers can be hydrolyzed so as to prepare the free hydroxy compounds, after the principal reaction hereof:

A solution of 0.17 g. of potassium hydroxide in 0.2 ml. of water 2.5 ml. of methanol is added over 30 minutes to a refluxing solution of 1 g. of $6\alpha$-fluoro-$9\alpha,11\beta,21$-trichloro-$16\alpha,17\alpha$-diacetoxypregna-1,4-diene-3,20-diene in 30 ml. of methanol under nitrogen. The solution is refluxed for 2 hours, cooled neutralized with acetic acid and concentrated under reduced pressure. After the addition of water, the solid which forms is collected by filtration and dried to yield $6\alpha$-fluoro-$9\alpha,11\beta,21$-trichloropregna-1,4-dien-$16\alpha,17\alpha$-diol-3,20-dione which is recrystallized from acetone:hexane.

To a mixture of 1 g. of 6α-fluoro-9α,11β,21-trichloro-16α-tetrahydropyran-2'-yloxypregna - 1,4 - dien-17α-ol-3,20-dione in 30 ml. of acetic acid is added 0.5 ml. of 2 N hydrochloric acid. The mixture is allowed to stand 5 hours at room temperature and then diluted with ice water and extracted several times with methylene chloride. The combined extracts are washed with water to neutrality, dried over sodium sulfate and evaporated to dryness to yield 6α-fluoro-9α,11β,21-trichloropregna - 1,4 - diene-16α,17α-diol-3,20-dione which is recrystallized from acetone: hexane.

In accordance with the foregoing methods, the following compounds are prepared:

6β-methyl-6α,7α-difluoromethylene-9α,11β,21-trichloro-16α,17α-isopropylidenedioxypregna-1,4-diene-3,20-dione,
6β,9α,11β,21-tetrachloro-6α,7α-difluoromethylene-16α-methylpregna-1,4-dien-17α-ol-3,20-dione,
6β,9α-difluoro-6α,7α-difluoromethylene-16α,17α-isopropylidenedioxy-21-chloropregna-1,4-dien-11β-ol-3,20-dione,
6α,7α-methylene-9α,21-dichloropregn-4-ene-11β,17α-diol-3,20-dione,
6,6-difluoro-9α,11β,21-trichloro-16α-methylpregna-1,4-diene-17α-ol-3,20-dione,
6,6-difluoro-9α,11β,21-trichloro-16α,17α-isopropylidenedioxypregna-1,4-diene-3,20-dione,
6,6-difluoro-9α,21-dichloro-16α,17α-cyclohexylidenedioxypregna-1,4-dien-11β-ol-3,20-dione,
6,6,9α-trifluoro-16α,17α-benzylidenedioxy-21-chloropregna-1,4-dien-11β-ol-3,20-dione, and
6,6-difluoro-9α,11β,21-trichloro-16α,17α-methylphenylmethylenedioxypregna-1,4-diene-3,20-dione.

What is claimed is:

1. The process useful for preparing a 21-chloro steroid of the pregnane series which comprises the step of reacting the corresponding 21-hydroxy steroid in dipolar aprotic reaction media with triphenylphosphine and carbon tetrachloride.

2. The process according to claim 1 wherein the dipolar aprotic reaction media is dimethylformamide.

3. The process according to claim 2 conducted with about equal molar amounts of each of 21-hydroxy steroid, triphenylphosphine and carbon tetrachloride.

4. The process according to claim 3 conducted at from about 10° C. to about 125° C.

5. The process according to claim 1 wherein there is prepared a compound selected from those represented by the following formula:

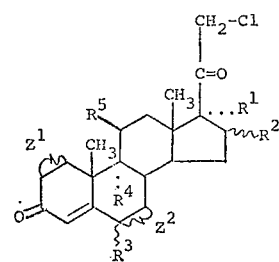

wherein
$R^1$ is hydroxy or a conventional hydrolyzable ester thereof;
$R^2$ is α-methyl, β-methyl, methylene, hydroxy or a conventional hydrolyzable ester thereof, or, when taken together with $R^1$, the group

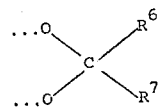

in which each of $R^6$ and $R^7$ are hydrogen, lower alkyl, monocyclic cycloalkyl or monocyclic aryl;
$R^3$ is hydrogen, methyl, chloro, or fluoro;
$R^4$ is hydrogen, chloro, or fluoro;
$R^5$ is oxo or the group

in which $R^8$ is hydroxy or chloro, provided $R^4$ is chloro when $R^8$ is chloro; and
each of $Z^1$ and $Z^2$ is a carbon-carbon single bond or a carbon-carbon double bond.

6. The process according to claim 1 wherein 6α-fluoro-9α,11β,21 - trichloro-16α,17α-isopropylidenedioxypregna-1,4-diene-3,20-dione is prepared.

7. The process according to claim 1 wherein 6α,9α-difluoro - 16α,17α - isopropylidenedioxy-21-chloropregna-1,4-dien-11β-ol-3,20-dione is prepared.

References Cited

Fieser et al.—Advanced Org. Chem., pp. 296 and 297, Reinhold Pub. Co., New York, 1961.

HENRY A. FRENCH, Primary Examiner

U.S. Cl. X.R.

260—397.45, 999

UNITED STATES PATENT OFFICE
CERTIFICATE OF CORRECTION

Patent No. 3,644,340  Dated February 22, 1972

Inventor(s) Beliq M. Berkoz

It is certified that error appears in the above-identified patent and that said Letters Patent are hereby corrected as shown below:

Column 2, line 43, "$R_8 \underline{\;\;} \overset{H}{\underset{\circ}{:}}$" should be -- $R^8 \underline{\;\;} \overset{H}{:}$ --.

Column 3, line 32, "illustrated" should be -- illustrative --.

Column 4, line 55 of Column C, "17α-isorpopylidenedioxy-pregn-" should be -- 17α-isopropylidenedioxypregn- --.

Column 4, line 62, "which esters ad ethers" should be -- which esters and ethers --.

Column 4, line 68, "1,4-diene-3,20-diene" should be -- 1,4-diene-3,20-dione --.

Signed and sealed this 19th day of December 1972.

(SEAL)
Attest:

EDWARD M. FLETCHER, JR.
Attesting Officer

ROBERT GOTTSCHALK
Commissioner of Patents